H. W. Conkling.
Reciprocating Saw Mill.
No. 93,417. Patented Aug. 10, 1869.

Witnesses;
Jas. I. Day
H. F. Eberk

Inventor;
Hudson W. Conkling.
Per Attorney
Thos. L. Sprague.

United States Patent Office.

HUDSON W. CONKLING, OF TECUMSEH, MICHIGAN.

Letters Patent No. 93,417, dated August 10, 1869.

IMPROVEMENT IN SAW-MILLS.

The Schedule referred to in these Letters Patent and making part of the same.

*To whom it may concern:*

Be it known that I, HUDSON W. CONKLING, of Tecumseh, in the county of Lenawee, and State of Michigan, have invented a new and useful Improvement in Devices for Changing the Rake of Muley-Saws; and I do declare that the following is a true and accurate description thereof, reference being had to the accompanying drawings, and to the letters of reference marked thereon, and being a part of this specification, in which—

Like letters refer to like parts in each figure.

Figure 1:
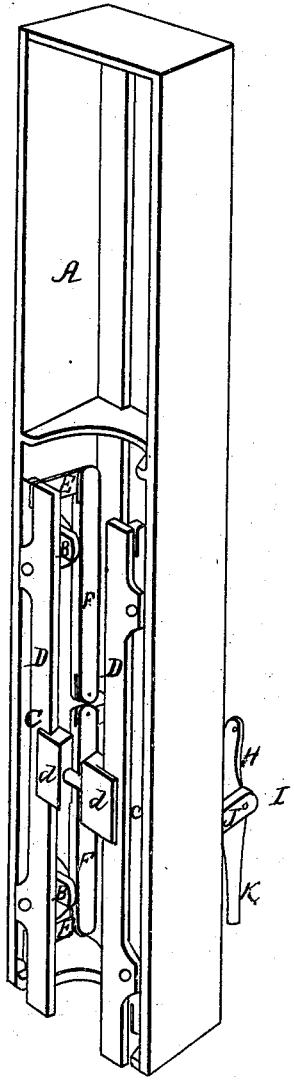
Figure 1 is a perspective view of an upper muley, with the guides thrown forward, to give the saw a raking cut.

The nature of this invention relates to an improved method of changing the rake of reciprocating mill-saws, by laterally moving the upper slides; and consists in a novel combination of the slides, guide-bars, and cross-head, and in attaching to the slides and the muley-box a system of levers, by means of which I am enabled to move the slides while the saw is in motion, to give it a rake proportionate to the feed of the log, as hereinafter more fully shown and set forth.

In the drawings—

A represents an upper muley-box of ordinary construction, in the sides of which are rigidly secured the studs B.

C are guide-bars, on the faces of which are bolted the slides D, between which the cross-head *d* reciprocates.

The guide-bars are formed with lugs *b*, in which are cut slots *c*, embracing the studs B, permitting a lateral movement of the guide-bars and slides.

Figure 2:
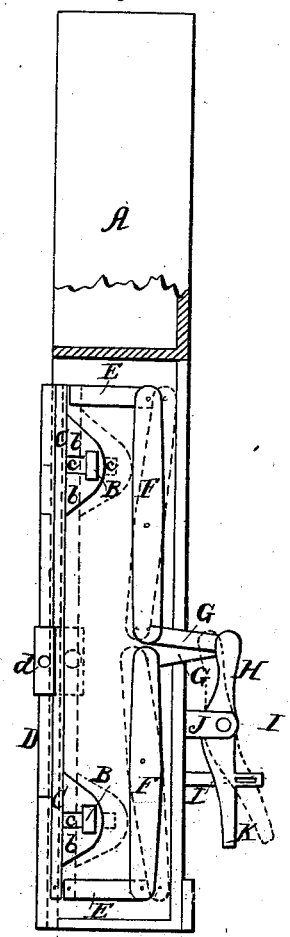
Figure 2 is a side elevation of the same, with one side of the muley-box removed, to show the mechanism employed to move the saw-guides.

To effect this lateral movement, I employ a system of levers, whose operation is clearly shown in fig. 2, and which I shall now describe.

E are links, pivoted to the upper and lower ends of the guide-bars C and to the outer ends of the levers F, which are pivoted in the rear sides of the muley-box.

To the inner ends of the levers F are pivoted the links G, connected to a rocker-arm, H, rigidly secured to a rock-shaft, I, journalled in proper bearings, J, projecting from the rear sides of the muley-box.

K is a hand-lever secured to the rock-shaft, by means of which the slides are moved laterally through the system of levers just described.

The hand-lever is secured in position by a set-screw and hand-nut, projecting from its side through a slotted quadrant, L, as shown, or by any other proper device.

Any appropriate means of producing the lateral movement of the guide-bars and slides while the saw is in motion, may be employed, instead of the system of levers herein described and shown.

This improvement is equally applicable to the slides of sash and gang-saws.

What I claim as my invention, and desire to secure by Letters Patent, is—

The combination of the slides D, the guide-bars C, provided with horizontal slots *c*, embracing the studs B, and the cross-head *d*, when constructed, arranged, and operating as and for the purposes above described.

Also, the levers F, the links E and G, the rocker-arm H, the rock-shaft I, the bearings *g*, and the hand-lever K, when arranged and operating as and for the purposes aforesaid.

Witnesses:        HUDSON W. CONKLING.
  H. F. EBERTS,
  JAS. I. DAY.